UNITED STATES PATENT OFFICE.

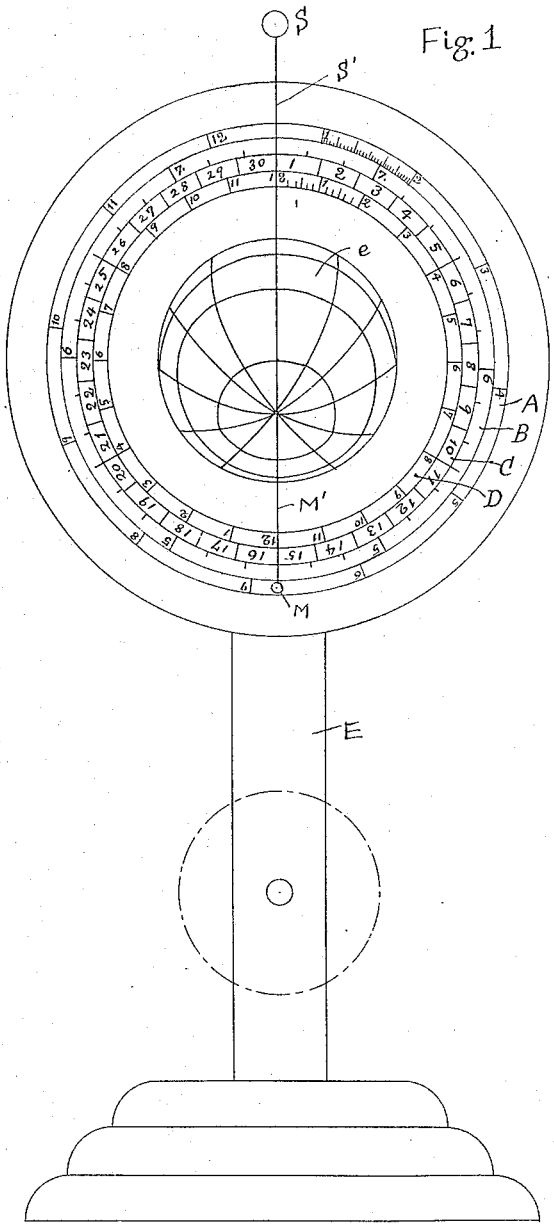

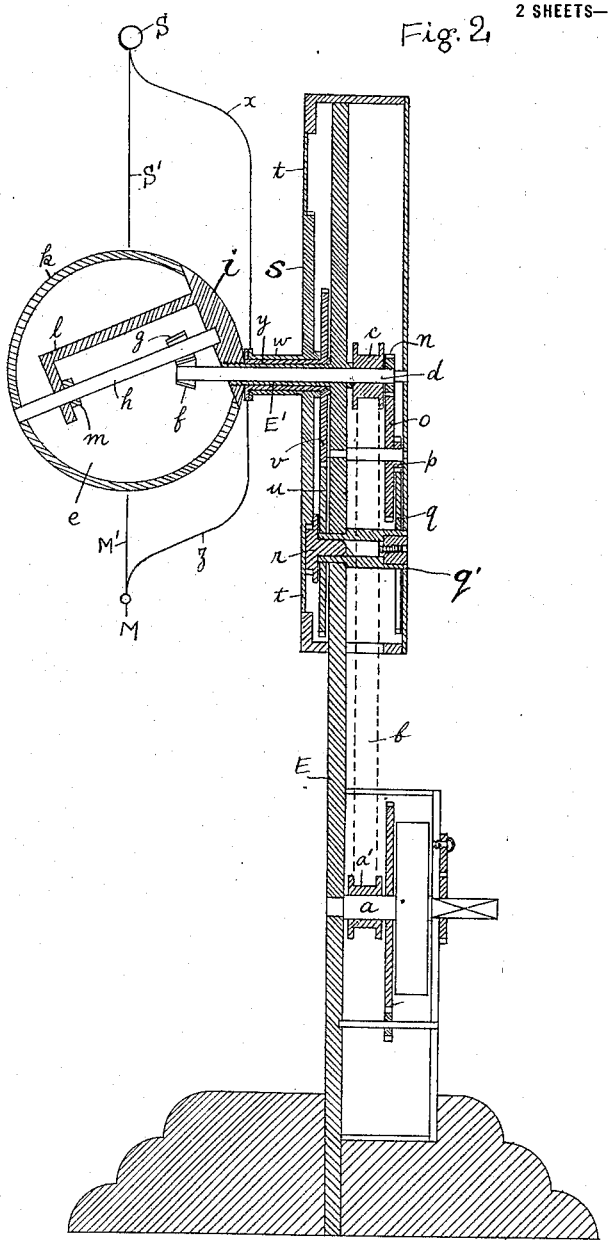

HIKOICHI TSURU, OF FUKUOKA-KEN, JAPAN.

MODEL OF THE SOLAR SYSTEM.

1,195,420. Specification of Letters Patent. Patented Aug. 22, 1916.

Application filed April 6, 1915. Serial No. 19,537.

*To all whom it may concern:*

Be it known that I, HIKOICHI TSURU, a subject of the Empire of Japan, residing at No. 1853, one of the houses of Mitsui's Coal Mine, Nara, Gotoji-machi, Tagawa-gun, Fukuoka-ken, Japan, have invented certain new and useful Improvements in Models of the Solar System, of which the following is a specification.

This invention relates to the construction of a model of the solar system, in which the terrestrial globe is divided into two parts, the one fixed part of which is affixed to the supporting sleeve of the standard frame, from which an angular arm extends into the globe; through which the supporting axis of the other moving part of the globe is passed and is rotatively fitted at its one-end to the said fixed part. A bevel wheel, fixed to said axis, is geared with a corresponding bevel wheel, the working axis of which is passed through the supporting sleeve at an inclination of about 23.5 degrees to the axis of the other bevel wheel, such inclination corresponding of course to the inclination of the axis of the earth from the vertical. The said working axis is provided with a sprocket wheel for the power transmission from the motor axis and a pinion wheel, which through several pairs of successive gearing wheels causes a dial plate to rotate, to a part of which a body corresponding to the sun is rigidly fixed, thus enabling the body to rotate together with said dial plate, and through another system of successive gearing wheels another body corresponding to the moon is made to rotate dependently, so that by suitably choosing the ratio of the teeth of the geared wheels, the globe, the sun and the moon are made to rotate in the ratio of the respective velocity of each *i. e.* 365:1:29.5.

The object of this invention is to simplify the construction of such a model, as well as to secure the actual relative positions of the three bodies, the sun, the moon and the globe as nearly exact as possible, so as to explain the phenomena caused by the variation of such relative positions.

In order that my said invention may be fully understood I will proceed to explain the same with reference to the accompanying drawings, in which—

Figure 1 is a front view of one example of this invention, and Fig. 2 of the sectional side elevation of the same.

In the drawings, ($a$) is an axis of a spring motor which is the same as that of common clock mechanism and makes one rotation daily (24 hours) and $b$ is a ring belt running from a sprocket wheel $a'$ fixed upon the axis $a$ to a sprocket wheel $c$ fixed upon an axis $d$ and thus rotates the axis $d$ at the same rate as the axis $a$, that is, one rotation per day. One end of the axis $d$ is extended into the terrestrial globe $e$ and has a fixed bevel wheel $f$ which is geared with a corresponding bevel wheel $g$ fixed upon an axis $h$ inclining at an angle of 23.5 degrees. The terrestrial globe $e$ is divided into two parts, one of which is a fixed part $i$, and the other a movable part $k$. The axis $h$ is at one end rotatably supported by the fixed part $i$ and at the other end rigidly fixed to the movable part $k$ and is rotatably supported at an intermediate part by the arm $l$ of the fixed part $i$, upon which a fixed collar $m$ of the axis $h$ bears and thus the globe $e$ rotates at the rate of one revolution per day.

The other end of the axis $d$ has a pinion wheel $n$ rigidly fitted thereto, which is geared with a spur wheel $o$. $p$ is a pinion wheel coaxial with the spur wheel $o$ and is geared with a spur wheel $q$ mounted on a shaft $q'$. $r$ is a pinion wheel co-axial with the spur wheel $q$ and is geared with a spur wheel $s$ made in one piece with a dial plate $t$. By suitably choosing these gears, the plate $t$ makes one rotation per year, or a rotation of one-three hundred and sixty fifth part of that the globe $e$ in a given time. The dial plate $t$ has four annular divisions marked successively from the outside to the inside marked with A, B, C, D. The division A is divided circumferentially into twelve sections each representing one month and these are again divided into days but only one section is so shown. The division B is suitably divided to denote the hours sun-set and sun-rise. Division C denotes the number of days in a month. Division D is divided into 24 parts corresponding to the number of hours in a day.

To the end of a sleeve $w$ made in one piece with the spur wheel $s$ is fixed a supporting rod $x$, at the extremity of which the sun S is fixed to which a pointer S' is fixed pointing in the direction of the center of the globe $e$. Therefore the sun and the pointer affixed thereto make the same rotation as the spur wheel S viz. one revolution per year. Moreover, the spur wheel $q$ rotates the wheel $u$ coaxial therewith and this in turn rotates the geared wheel $v$. This wheel $v$ has a sleeve $y$ which is arranged between the said sleeve $w$ of the spur wheel S and the bearing sleeve projecting from the standard E. This sleeve $y$ has at its end a supporting rod $z$ fixed thereto and at the extremity of this supporting rod the moon M is fixed to a pointer M' which points toward the center of the globe. The gears of the wheels $n$, $o$, $p$, $q$, $u$ and $v$ are such that the final wheel $v$ makes one rotation every 29.5 days and thus makes the moon M revolve around the globe every 29.5 days. Lines of latitude and longitude are drawn upon the surface of the globe.

By means of the stated arrangement, if we mark our positions upon the globe, the pointers S' and M' respectively of the sun S and the moon M will indicate the relative positions of the three bodies the sun, the moon and the globe, and such phenomena as the tides, eclipses of the sun or moon can be explained. The wheel $r$ is connected to its axis $q'$ by a friction clutch and therefore the parts can be rapidly rotated by hand when giving an explanation of the arrangement.

What I claim is:

1. A model of the solar system comprising a stationary frame, a terrestrial globe formed in two parts one of which is fixed to said frame and the other rotatable on said fixed part, a shaft fixed at one end to said rotatable part and rotatably engaging the fixed part at the other end, a bevel gear on said shaft, a second shaft mounted on said frame at an angle of about 23.5 degrees to the first-mentioned shaft, a bevel wheel on said second shaft engaging the other bevel wheel, and means for rotating said second shaft.

2. A model of the solar system comprising a stationary frame, a terrestrial globe formed in two parts one of which is fixed to said frame and the other rotatable on said fixed part, a shaft fixed at one end to said rotatable part and rotatably engaging the fixed part at the other end, an arm extending from said fixed part and provided with a bearing portion for said shaft, a bevel gear on said shaft, a second shaft mounted on said frame at an angle of about 23.5 degrees to the first-mentioned shaft, a bevel wheel on said second shaft engaging the other bevel wheel, and means for rotating said second shaft.

3. A model of the solar system comprising a stationary frame, a terrestrial globe formed in two parts one of which is fixed to said frame and the other rotatable on said fixed part, a shaft fixed at one end to said rotatable part and rotatably engaging the fixed part at the other end, a bevel gear on said shaft, a second shaft mounted on said frame at an angle of about 23.5 degrees to the first-mentioned shaft, a bevel wheel on said second shaft engaging the other bevel wheel, a sleeve surrounding said second shaft and carrying a member representing the sun, another sleeve surrounding said second shaft and carrying a member representing the moon, and means for rotating the second shaft and the said sleeves at the relative speeds of about $$1, \frac{1}{29.5}, \text{ and } \frac{1}{365}.$$

In testimony whereof I affix my signature in presence of two witnesses.

HIKOICHI TSURU.

Witnesses:
 GENJI KURIBARA,
 SHIGEYOSHI SUZUKI.

Copies of this patent may be obtained for five cents each, by addressing the "Commissioner of Patents, Washington, D. C."